(12) United States Patent
Al-Azzawi

(10) Patent No.: US 8,112,601 B2
(45) Date of Patent: Feb. 7, 2012

(54) DATA STORAGE DEVICE WITH SECURITY FEATURE

(76) Inventor: Jasim Saleh Al-Azzawi, Dubai (AE)

( * ) Notice: Subject to any disclaimer, the term of this patent is extended or adjusted under 35 U.S.C. 154(b) by 496 days.

(21) Appl. No.: 12/268,323

(22) Filed: Nov. 10, 2008

(65) Prior Publication Data

US 2009/0067079 A1    Mar. 12, 2009

Related U.S. Application Data

(63) Continuation-in-part of application No. 10/913,435, filed on Aug. 9, 2004, now Pat. No. 7,724,458.

(51) Int. Cl.
*G06F 21/00* (2006.01)
(52) U.S. Cl. .............. 711/163; 711/173; 726/27
(58) Field of Classification Search ............. 711/173
See application file for complete search history.

(56) References Cited

U.S. PATENT DOCUMENTS

| | | | |
|---|---|---|---|
| 4,578,551 A * | 3/1986 | Lin | 200/400 |
| 5,617,393 A * | 4/1997 | Itami et al. | 369/53.21 |
| 6,266,159 B1 * | 7/2001 | Otsuka et al. | 358/405 |
| 6,272,533 B1 * | 8/2001 | Browne | 709/213 |
| 6,373,648 B2 * | 4/2002 | O'Connor | 360/63 |
| 7,003,674 B1 * | 2/2006 | Hamlin | 713/193 |
| 7,069,447 B1 * | 6/2006 | Corder | 713/189 |
| 7,146,640 B2 * | 12/2006 | Goodman et al. | 726/16 |
| 2002/0190823 A1 * | 12/2002 | Yap | 335/205 |
| 2003/0120685 A1 * | 6/2003 | Duncombe et al. | 707/200 |
| 2006/0136694 A1 * | 6/2006 | Hasbun et al. | 711/173 |
| 2007/0192854 A1 * | 8/2007 | Kelley et al. | 726/22 |

* cited by examiner

*Primary Examiner* — Brian Peugh
*Assistant Examiner* — Nicholas Simonetti
(74) *Attorney, Agent, or Firm* — Moore Patents; David Dreyfuss

(57) ABSTRACT

A data storage device is disclosed with at least two partitions and a set of switches to separately enable and disable read and write operations to each of the partitions, wherein read and/or write operations for at least one of the partitions is disabled when the data storage device is accessible by one or more potentially malicious processes. In one embodiment, there are five partitions for (1) operating systems and trusted applications, (2) applications from non-trusted sources, (3) confidential data, (4) non-confidential data, and (5) all other data. A mode switch can be used to enable and disable reading and writing for each of the partitions according to a predetermined set of rules that effectively prevent viruses and other malware from altering or accessing programs and data.

6 Claims, 1 Drawing Sheet

DATA STORAGE DEVICE WITH SECURITY FEATURE

CROSS REFERENCE TO RELATED APPLICATIONS

This application is a Continuation-in-Part Application claiming priority from U.S. patent application Ser. No. 10/913,435, now U.S. Pat. No. 7,724,458, filed Aug. 9, 2004.

FIELD OF THE INVENTION

The present invention generally relates to apparatuses and methods for protecting data on data storage devices from malicious alterations, additions, and deletions and from unauthorized access.

BACKGROUND OF THE INVENTION

A great deal of data and productivity is lost every day by users of computers and other devices with embedded processors and data storage due to a variety of malicious processes, typically running on a user machine without user knowledge or permission and accessing or altering user data in system memory or on attached data storage devices without user knowledge or permission. These malicious processes are collectively known as malware, and are given a variety of specific names according to the nature of their function: viruses, spybots, adware, phishing, and the like. Some forms of malware alter, add, or delete user data; others merely gain access to confidential user information or record user activity. Users are tricked into loading such malicious data and processes, and/or allowing malicious or unauthorized access to data by means of whatever communications paths are available including removable data storage media and network connections. The resulting financial losses can be measured in billions of dollars, and an entire industry has developed to combat the problem.

Prior art systems provide limited means of segregating and protecting user data and processes from malicious access. Protection can be provided by completely isolating a system, allowing no data to be loaded from the outside after factory setup and providing no network connections of any sort. Alternatively, certain data storage devices are provided with software and/or hardware means to designate some or all of the storage space as "read-only." For example, many optical disks can be configured to forbid alteration or deletion of stored data once written. Floppy disks are provided with a hardware "switch" (a mechanical flag) which signals the disk drive that the stored data are read only. Some semiconductor memory devices can be put into a read-only state ("ROM" or "read-only memory"). These devices can be loaded with malware-free data in a secure environment, and the data thereafter can exist in a read-only state thereby preserving the integrity of the data. When applications are delivered on such devices, however, the application is often "installed" or copied from the secure device into read-write memory which is not safe from malicious attack. Users may perform such installations for reasons of access speed: read-write data storage devices typically have faster access times than read-only devices (for example magnetic disks compared to optical disks). Users of a given application may also need to store new data. For example, a word processing application is designed to edit and create new data which must be stored in a writeable data storage device. A cell phone must be able to store a contact list of names and phone numbers. A navigation system typically stores information about routes traveled. Most applications must also store user configuration data that customizes the behavior of the application for the user and the particular hardware and software environment and/or records use history.

While read-write data storage is convenient to use for all these reasons, it is vulnerable to unauthorized alteration, deletion, and access. Operating systems typically provide a permission mechanism to control access, at least at the file system level. However, such systems remain vulnerable to determined malicious attack in that various means have been devised to circumvent these software file permission protection mechanisms. A common approach to protecting a system from malicious attack has been to install additional software: "antivirus" software as well as similar protection software to detect and remove adware and spybots and to protect from phishing attacks. Such software packages typically look for an identifiable signature of known malware entities and respond accordingly by removing or sequestering the offending memory or files. These software packages must be updated frequently as new malware entities are developed, and significant system resources are required both to download the updates and to regularly scan all vulnerable data storage for possible infection. Further, when a new malware entity appears, systems are vulnerable until an update to protection software can be developed, distributed, installed, and run. Considerable damage can be done during this time interval.

SUMMARY OF THE INVENTION

A data storage device is disclosed with at least two partitions and a set of switches to separately enable and disable read and write operations to each of the partitions, wherein read and/or write operations for at least one of the partitions is disabled when the data storage device is accessible by one or more potentially malicious processes. In one embodiment, there are five partitions for (1) operating systems and trusted applications, (2) applications from non-trusted sources, (3) confidential data, (4) non-confidential data, and (5) all other data. A mode switch can be used to enable and disable reading and writing for each of the partitions according to a predetermined set of rules that effectively prevent viruses and other malware from altering or accessing programs and data.

DETAILED DESCRIPTION OF THE INVENTION

Figure 1:
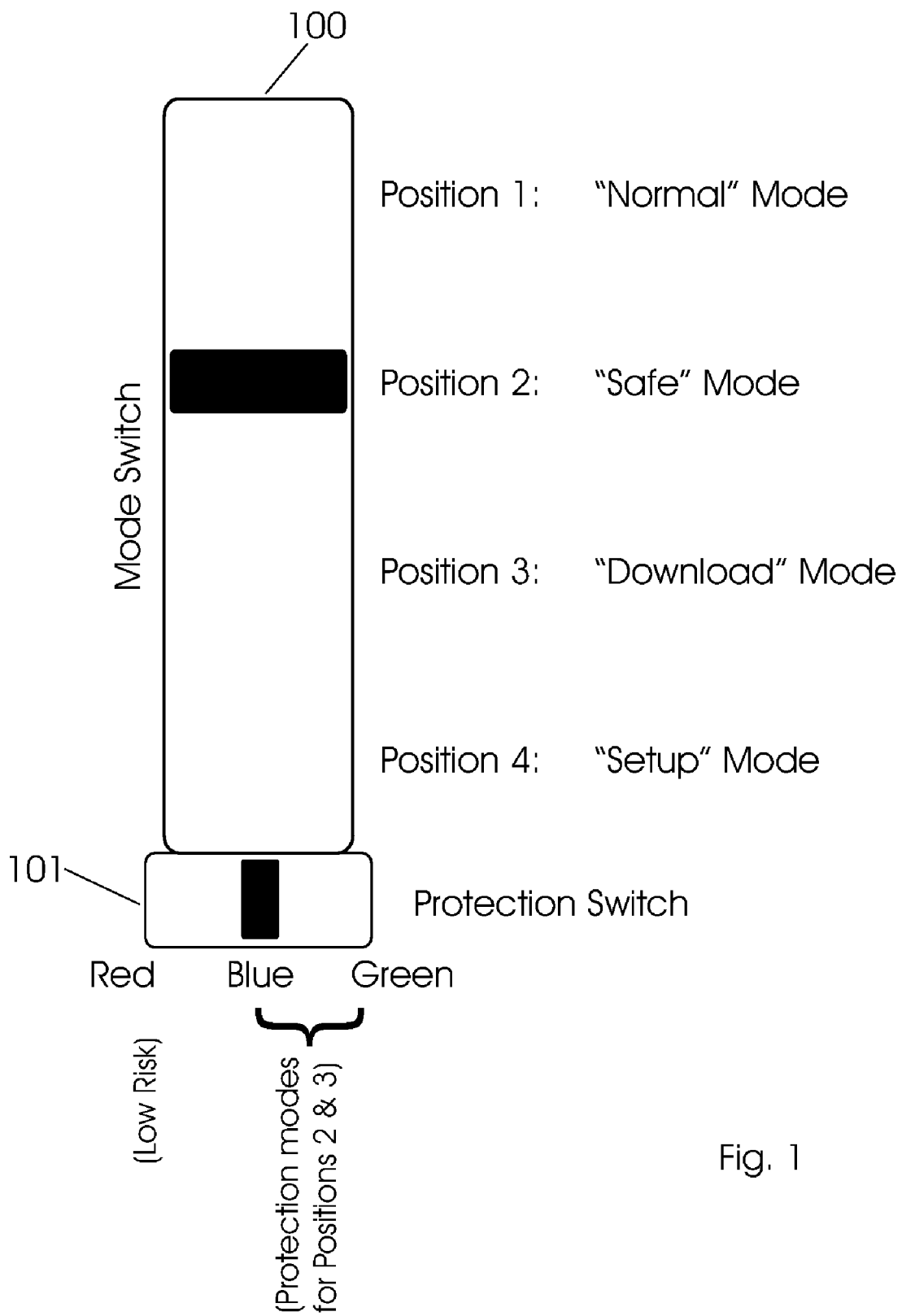
FIG. 1 shows an example of a mode switch for use with an embodiment of the present invention.

In accordance with one of more embodiments of the present invention it is useful to classify data stored on a data storage device into two or more categories with respect to security and risk of infection. For example and without limitation, five such categories can be used. Data for each of the five categories can be stored in separate "partitions" within a data storage device:

1. "Trusted partition": trusted applications (programs) and operating systems, typically factory-installed or installed from a trusted source such as a supplier's CD or DVD,
2. "Internet application partition": applications downloaded from the internet or other source of uncertain integrity,
3. "Confidential partition": confidential user-generated data, 4. "Non-confidential partition": non-confidential user-generated data plus data from trusted sources,
5. "Internet data partition": data downloaded from the internet or other source of uncertain integrity.

("Data" can include documents, drawings, photographs, music, movies, or any other information that can be stored as digital data.)

Data storage can be divided into partitions of suitable size to store each of these five categories of data. For example and without limitation, a magnetic hard disk drive can be used to store the file system of a personal computer. A magnetic hard disk drive typically comprises a set of platters. For each platter, there are two arms, one for the upper surface and a second one for the lower surface, where each arm carries two heads, one for reading data from the platter surface and the other for writing new data and deleting data previously written. Each partition can comprise one or more platter surfaces according to the storage needs for each category of data.

In accordance with one of more embodiments of the present invention, a set of hardware switches can be provided that enable and disable reading and/or writing/deleting functions for each partition separately. For example and without limitation, the switches can interrupt the electrical signal connections to the read and write heads of a magnetic disk or otherwise enable and disable the heads. Other types of data storage may require different hardware details to enable and disable read and write functions. Any means of enabling and disabling read and write functions to a selected data partition can be used. For example and without limitation, the data stream can be interrupted, power to a read or write head can be interrupted, or the read/write function can be disabled by other means such as placing a read/write head in a locked parking position, lifting a read or write head to a non-functional position, turning off a required clock signal, lowering the power to a read/write head below a functional threshold, etc. For devices other than magnetic hard disk drives, different mechanisms may be appropriate for enabling and disabling read and write/delete functions. For the purpose of this description, the word "channel" will be used to refer to a generic data path to or from a data storage device, and "enabling or disabling a read or write channel" is used to describe the generic version of the process of enabling or disabling read or write functionality for an arbitrary data storage device.

In accordance with one or more embodiments of the present invention, the user controls the hardware and the data security level by physically moving mechanical switches mounted external to the case containing the data storage device. In certain embodiments, such mechanical switches can directly perform the enable/disable function. In other embodiments, the signal to be interrupted may be a high-bit-rate signal line that cannot readily be routed through a mechanical switch on the external case. In such embodiments, it may be necessary to read the switch position with digital logic, which, in turn, implements the actual enable/disable function indirectly via suitable high-speed logic circuitry. (When not otherwise identified, the term "switch" is use generically herein to refer to both mechanical and electronic switching mechanisms that can enable or disable read and write operations to a portion of data in a data storage device.)

If indirect switching with digital logic is used, it is preferably implemented in a tamperproof configuration that cannot be controlled by any means other than the external mechanical switches. For example, it may not be desirable to use the processor of a host computing machine to implement the indirect switching logic. Such a configuration could be vulnerable to virus attack if a virus were designed to take control of the switching logic. Similarly, it may not be desirable to allow the host computer to control the data storage device partitioning function once a new device is partitioned. Again, a virus could, in principle, reallocate partitions and overcome the assigned security status of particular portions of memory by reassigning them to less secure partitions. However, such host computer control can be a convenience to system designers, administrators and users. It is possible to allow the host computer to manage at least the partitioning and repartitioning of a data storage device as long as such partitioning and repartitioning are performed under suitably secure conditions when no potentially risky external network connections exist, and no non-trusted data storage medium is loaded. For example and without limitation, a data storage device could have a separate mechanical "partition-lock" switch, which can be mounted in a location not accessible from outside the external case. In the locked position, no changes to partition configuration would be possible. Partitioning and repartitioning would be enabled only when the partition-lock switch was in the unlocked position. Further, in accordance with one or more embodiments of the present invention, the partition-lock switch can be a spring-loaded or momentary contact switch, so that a user must hold the switch in the unlocked position to enable partitioning and repartitioning. In other embodiments of present invention, the switch can include a timing feature such that it returns automatically to the locked state after a period of time somewhat longer than the minimum required for the partitioning or repartitioning. This time should be long enough to comfortably complete the partitioning or repartitioning, but no longer.

In general, each read or write channel (for example, each head for each platter of a magnetic hard disk) can be independently enabled and disabled. In accordance with one or more embodiments of the present invention, when there are many such channels associated with a single partition, the mechanisms to enable/disable the individual channels can be grouped together in multi-pole switch configurations, which allows a user to be presented with fewer switches than read/write heads. For example and without limitation, a user could be presented with only one switch per partition, and the controls for all heads or channels assigned to each partition could be set up as poles on the corresponding switch. Such a set-up can be purely mechanical, or it can be implemented with the aid of secure switching logic whose configuration is protected with the aid of a partition-lock switch or similar security mechanism as described above.

In accordance with one or more embodiments of the present invention, the switches provided for user control over data security can be further configured to provide a set of protection modes. In accordance with one such embodiment, each switch controls one or more pairs of channels for reading and writing a partition, and each switch has three positions. In the first position, both read and write functionality for the partition are enabled. In the second position, the write functionality is disabled, and the read functionality remains enabled. In the third position, both read and write functionality is disabled, and no data access is possible.

In accordance with one or more additional embodiments of the present invention, a single multi-position switch is provided for user control of protection modes. For example, and without limitation, a mode switch for a computing machine can be provided with four positions, at least one of which can additionally require the release of security latches for access. The first position and mode can be called the "normal" position/mode, which would be used by typical users most of the time, and in particular, whenever they are connected to the internet. In this position the following read/write channels are enabled or disabled by partition:

1. "Trusted partition": read enabled, write/delete disabled (i.e., safe from viruses),
2. "Internet application partition": read enabled, write/delete disabled (i.e., safe from viruses),
3. "Confidential partition": read and write/delete disabled (i.e., safe from viruses and unauthorized access),
4. "Non-confidential partition": read enabled, write/delete disabled (i.e., safe from viruses),
5. "Internet data partition": read and write/delete enabled (all new data and documents are stored on this partition when connected to the internet).

The second position and mode are used when the user is disconnected from the internet and wishes to edit, add, or delete data on Partitions 3 or 4. In this position, the following read/write channels are enabled or disabled by partition:

1. Trusted partition: read enabled, write/delete disabled (i.e., safe from viruses),
2. Internet application partition: read enabled, write/delete disabled (i.e., safe from viruses),
3. Confidential partition: read and write/delete enabled,
4. Non-confidential partition: read and write/delete enabled,
5. Internet data partition: read and write/delete disabled (i.e., any malware present on this partition cannot act or be copied to another partition).

Users can choose to disconnect from the internet before switching to Mode 2 so that it is not possible for an unauthorized person or program to gain access to confidential data or documents. In accordance with one or more embodiments of the present invention, the connection to the internet can also be physically and automatically disabled or disconnected when the control switch is in the second position (for example, by adding an additional pole to the mode switch to disable the internet connection in Mode 2). For further security, and especially if the user knows that a suspicious site was accessed, the computing machine may be restarted just before moving the control switch to the second position. This will ensure that any virus or other malware hidden in system memory will be erased before making Partition 3 and 4 accessible for edit/write/delete operations.

The third position and mode are used to download software from the internet or to install software from other sources of questionable integrity. If the computing machine is on, it can be turned off first to ensure that any virus or other malware hidden in system memory has been eliminated. A first safety latch can be provided which must be released to allow the control switch to be moved to the third position. In this position, the following read/write channels are enabled by partition:

1. Trusted partition: read enabled, write/delete disabled (i.e., safe from viruses),
2. Internet application partition: read and write/delete enabled,
3. Confidential partition: read and write/delete disabled,
4. Non-confidential partition: read enabled, write/delete disabled,
5. Internet data partition: read and write/delete disabled (i.e., any malware present on this partition cannot act or be copied to another partition).

This mode is used only to load new applications from the internet or other unreliable source. Applications are loaded into Partition 2, the internet application partition. Before they are run, the control switch is returned to the first or second position. Viruses are unable to affect any applications on Partitions 1 or 2, because these partitions are in a read-only state whenever the applications are running.

The fourth position and mode are used for formatting disks, assigning and reassigning partitions, and installing applications, data, and documents when the user is absolutely confident that no security hazards exist (no non-secure network connection is active, and all removable media to be used are trusted). All partitions are fully enabled for reading, writing, and deleting. In accordance with one or more embodiments of the present invention, a second safety latch can be provided that must be released to move the control switch from Position 3 to Position 4. Thus, two latches would need to be deliberately released to allow a user to move the control switch from Position 1 or 2 to Position 4.

In accordance with one or more embodiments of the present invention, a third safety latch can also be provided. This third latch can lock the control switch in Position 1. This additional latch, which can be provided with a physical lock or protected by some sort of code, user ID, or password access limitation, if desired, can be used on computing machines where a system administrator does not trust general users to properly use the control switch in any but Position 1. Examples include computing machines for at least part-time public access in schools and libraries, computing machines shared by parents and young children, and the like. The computer remains in the most secure mode (Mode 1) unless the third latch is released and the Mode switch is moved by an authorized administrator.

In accordance with one or more further embodiments of the present invention, Modes 2 and 3 can be further refined by dividing them into submodes. Various hardware implementations and user interfaces can be used. For example, and without limitation, as shown in FIG. 1, the main mode switch can be implemented as a slide switch 100 with four positions. A second "protection switch" 101 can be implemented, for example and without limitation, as a second slide switch, oriented adjacent to and perpendicular to the main mode switch, with positions marked "red," "blue," and "green" (or A, B, and C or any other convenient labels). This second switch can be ignored in Modes 1 and 4 (i.e., all positions of the protection switch provide the same mode when the main mode switch is in positions 1 or 4).

In Mode 2 as previously defined, read/write access is provided for Partitions 3 and 4 (confidential and non-confidential data). There is a potential risk that applications downloaded from the internet (which can be run in Mode 2) could contain viruses that could damage data in Partitions 3 and 4. If the user is confident that this risk is very low, then the protection switch can be left in the "red" position, and the read and write channels are enabled or disabled as previously described. If the user is not sure, two alternate modes can be provided. With the protection switch in the "blue" position, the internet application partition (Partition 2) is disabled (no read or write). Trusted applications from Partition 1 can be run and allowed access to data on both Partitions 3 and 4. With the protection switch in the "green" position, write access is disabled for Partitions 3 and 4, and the internet application partition (Partition 2) is enabled for both read and write. This mode can be used to run possibly suspect applications from Partition 2 without risk of damage to data on Partitions 3 and 4. These data are still available to read but not to write, modify, or erase. Any new data are written instead to Partition 2, where such data can remain quarantined after the application is terminated and the protection switch is returned to the blue position. Note that these new data written on Partition 2 in Mode 2 are accessible (read only) in Mode 1. A user can, for example and without limitation, transmit documents or other data written in Mode 2 via e-mail (or FTP or other communications protocol) over the internet or an intranet after switching back to Mode 1.

Mode 3 as previously defined, is used solely to install new applications from non-trusted sources. As such, only the internet application partition (Partition 2) is enabled for write operations. This mode is provided with the protection switch in the "blue" position. Users may also have a need to load accessories or updated for trusted applications as well. In the four modes as previously defined, such updates could only be made in Mode 4, where read and write is enabled for all partitions. To avoid any possible risks from malware installed on Partitions 2 or 5 (the internet application and data partitions), an alternate Mode 3 can be provided when the protection switch is in the "green" position. In this mode, read and write are enabled for Partition 1 (the trusted application partition), and access to all other partitions is fully disabled. Updates, accessories, and new applications can be installed on Partition 1 from trusted media such as vendor-supplied CDs or DVDs.

A total of seven distinct protection modes are provided with the alternate versions of Modes 2 and 3. While these have been described in an exemplary manner with a user interface comprising a main mode switch and a secondary protection switch, any other suitable interface providing access to the same seven modes or obvious variations thereof are within the scope of the present invention. For example and without limitation, a single mode switch with seven positions can provide means of selecting among the seven modes. The four- and seven-mode configurations are summarized in the following table:

| Position(s) | Partition 1 | Partition 2 | Partition 3 | Partition 4 | Partition 5 |
| --- | --- | --- | --- | --- | --- |
| 1 | Read only | Read only | Disabled | Read only | Read/write |
| 2 or 2-red | Read only | Read only | Read/write | Read/write | Disabled |
| 2-blue | Read only | Disabled | Read/write | Read/write | Disabled |
| 2-green | Read only | Read/write | Read only | Read only | Disabled |
| 3 or 3-red/blue | Read only | Read/write | Disabled | Read only | Disabled |
| 3-green | Read/write | Disabled | Disabled | Disabled | Disabled |
| 4 | Read/write | Read/write | Read/write | Read/write | Read/write |

In accordance with one or more further embodiments of the present invention, three partitions can be used instead of five. These embodiments are especially suitable for devices such as cell phones which have a limited number of data types and have no need to distinguish between confidential and non-confidential data. For example and without limitation, partitions can be created for (1) operating systems, and trusted applications; (2) trusted data such as telephone numbers, text files, music files, photos, and the like; (3) non-trusted data and applications, such as data or applications downloaded from the internet or provided by non-trusted sources.

Similar switching configurations to those described above for the five-partition configuration can be implemented. For example and without limitation, a mode switch can be used to enable and disable reading and writing for each of the partitions according to a predetermined set of rules that effectively prevent viruses and other malware from altering or accessing programs and data. In accordance with one or more embodiments of the present invention, a three-position mode switch can be used, and the predetermined set of rules can be defined by the following table:

| Position | Partition 1 | Partition 2 | Partition 3 |
| --- | --- | --- | --- |
| 1 | Read only | Read only | Read/write |
| 2 | Read only | Read/write | Disabled |
| 3 | Read/write | Disabled | Disabled |

From the table above it can be readily seen that when the mode switch is in Position 1, the operating system, and trusted applications are safe from alteration but readable, and the device can save all internet data on the third partition, (non-trusted data partition). When the mode switch is in Position 2, operating systems and trusted applications (Partition 1) are safe from alteration, and non-trusted data (Partition 3) cannot act or be altered (no read or write). No virus can move from this partition to the other partitions. Trusted data (Partition 2) can be read and written, so new phone numbers, music, text files, or other trusted data can be added. For added security, the device can be manually or automatically disconnected from the internet while in Mode 2 to ensure that Partition 2 is not vulnerable to external unauthorized access while in Mode 2. Position 3 is used solely to add or update operating system and trusted applications on Partition 1. Partitions 2 and 3 are disabled.

In accordance with one or more embodiments of the present invention, a device using a data storage device with three partitions can have an additional switch internal to the device and/or not accessible under normal use conditions. This switch can activate a fourth mode where read and write operations are enabled on all partitions. Such a mode would typically be used by the manufacturer or service personnel for system configuration and software installation or reinstallation.

In accordance with one or more further embodiments of the present invention, the data storage device for a cellular telephone or other device can be configured with just two partitions, for example, by combining the functions of Partitions 1 and 2 in the three-partition configuration. For example and without limitation, partitions can be designated for (1) operating systems and trusted applications plus trusted data, such as telephone numbers, text files, music files, photographs, and the like; and (2) non-trusted data and applications, such as data or applications downloaded from the internet or provided by non-trusted sources.

Similar switching configurations to those described above for the five- and three-partition configurations can be implemented. For example and without limitation, a mode switch can be used to enable and disable reading and writing for each of the partitions according to a predetermined set of rules that effectively prevent viruses and other malware from altering or accessing programs and data. In accordance with one or more embodiments of the present invention, a two-position mode switch can be used, and the predetermined set of rules can be defined by the following table:

| Position | Partition 1 | Partition 2 |
| --- | --- | --- |
| 1 | Read only | Read/write |
| 2 | Read/write | Disabled |

From the table, it can be seen that when the mode switch is in Position 1, operating systems and trusted data are safe from alteration but readable, and the device can save all internet data on the second partition, (non-trusted data partition). When the mode switch is in Position 2, Partition 2 is disabled for both read and write, but Partition 1 is fully enabled so that the user can add new programs or new phone numbers, music, text files, and other trusted applications or data to Partition 1. As with the three-partition configuration, an additional mode can be provided that can only be enabled by means of a switch that is internal to the device and/or not accessible under normal use conditions. This third mode enables read and write operations on all partitions. Such a mode would typically be used by the manufacturer or service personnel for system configuration and software installation or reinstallation.

In accordance with one or more embodiments of the present invention, system memory (for example, the volatile semiconductor memory located on a computing machine motherboard where running programs and associated data reside) can also be divided into two partitions: "regular memory" and "internet memory." Typically, these partitions are physically located on separate chips, and internet memory can be powered on and off independently of regular memory. Other configurations and methods of enabling and disabling memory access are also within the scope of the present invention as long as there are means provided to completely erase the internet memory without affecting the regular memory, and it is possible to control which partition of memory can be written by applications resident on the trusted and internet application partitions or used to buffer data on the confidential, non-confidential and internet data partitions.

When the control switch is in Mode 1 (or the system is otherwise configured to allow memory access by potentially untrustworthy applications and to permit potentially untrustworthy data to be loaded into memory), the regular memory is used only for and by the operating system and applications running from the trusted data storage device partition. The internet memory is used for all other purposes. In other words, non-trusted applications and any applications which may be handling data from non-trusted sources are only permitted to write to internet memory. In accordance with one or more embodiments of the present invention, when switching to Mode 2 (or the system is otherwise configured such that no access to potentially untrustworthy applications, documents, or data is possible), power is removed from the internet memory for at least one second so that any viruses or other malware hidden in the internet memory is erased. Other reliable means of erasing all of the internet memory may also be used, such as and without limitation, explicitly overwriting all data. Internet memory can also be automatically reset or erased when all non-trusted applications are terminated. Additionally, an external switch can be provided allowing a user to reset (erase all of) the internet memory whenever the user suspects exposure to suspicious applications or data.

The partitioning of memory into regular and internet memory and the reset/erasure of the internet memory can be set up so as to be strictly under user control, or at least only under the control of trusted applications. Preferably, it is not physically possible to create a virus that can repartition memory or erase internet memory.

A computing machine or other apparatus which has been configured with a data storage device and/or system memory which can be managed in accordance with one or more embodiments of the present invention can be used in various ways. For example and without limitation, a user who wants to disable all of the protection features of the present invention may do so by putting the four-position mode switch in Position 4. All read and write/delete channels would be enabled and the data storage device could be used as a conventional device either with no protection or with protection provided using antivirus software and the like. As another example and without limitation, a user may not have confidential data and could choose to allocate no space for the confidential partition or to configure the modes so that the confidential partition is treated identically to the non-confidential partition.

In accordance with one or more embodiments of the present invention, the methods and devices disclosed herein can be used with any apparatus or system requiring data storage. For example and without limitation, such methods and devices can be used advantageously with any computing system which is subject to access via a network or which may be connected to a removable data storage medium of uncertain origin. Such computing systems include personal handhelds, laptops and desktop computers for home and business use, as well as servers and other computing machines configured to support business operations. Other handheld, portable, and fixed-location devices and appliances that incorporate data storage devices and have potential connections for unauthorized or malicious access can similarly benefit from the use of the methods and devices disclosed herein. Such devices and appliances include, for example and without limitation, personal communications devices such as cell phones, satellite phones, desk telephones, and answering machines; portable music players; portable and non-portable video devices; digital cameras; security systems; remote monitoring systems; industrial monitoring and control systems; dataloggers; etc.

In accordance with one or more embodiments of the present invention, the methods and devices disclosed herein can prevent malware attacks on stored data in any data storage device associated with any of the above-mentioned computing machines and appliances without the use of separate protection software. The importance of such prevention may vary according to the function of particular computing machines and appliances and the nature of the specific attack. The value of protecting data from loss, unauthorized alteration or deletion, or even just unauthorized access can be very significant. In some cases, the value can be in avoiding unnecessary repetition of work and the nuisance of regenerating data or retrieving data from backup resources. In other cases, such as devices related to health and safety monitoring, control, or datalogging, lives can be saved by protecting the integrity of stored data. In still other cases, consumer privacy, or corporate or national security can be protected by the prevention of unauthorized access to sensitive data. By installing data storage devices incorporating the methods disclosed herein, computing devices and appliances can be built that are naturally immune to all types of malware attacks. No special security software need be installed; no periodic updates are required; and the protection is always up to date, because no new means of attack are possible. Users will require little or no education in the use of the methods. Most users may never need to move the mode and protection switches, or at most, will need to learn how and when to switch between a couple of regularly-used positions. After a few years, when most computing devices and appliances in use incorporate data storage devices practicing the methods of the present invention, there will no longer be any incentive for anyone to write malware processes, and software created to combat malware will become obsolete.

It is to be understood that the claims are not limited to the specific embodiments described herein but can include any embodiment, variation, or application that a person of ordinary skill would recognize as being obvious in light of the teachings herein.

What is claimed is:

1. A data storage device comprising:
   at least two partitions; and
   a set of manually operated switches;
   wherein said manually operated switches can be independently set for each partition into each of read/write, read only, and disabled modes;
   wherein read/write and/or write operations for at least one of said partitions is disabled by a user when said data storage device is believed to be accessible by one or more potentially malicious processes;
   wherein said set of manually operated switches comprises at least one mechanical switch mounted such that it can be manually operated from outside the outer case of any computing machine using said data storage device; and
   wherein said set of manually operated switches further comprises a mode switch, wherein the positions of said mode switch enable and disable reading and writing separately for each of said partitions according to a predetermined set of rules;
   further comprising separate partitions for (1) operating systems and trusted applications, (2) applications from non-trusted sources, (3) confidential data, (4) non-confidential data, and (5) all other data;
   wherein said mode switch has four positions and the predetermined set of rules is defined by the following table:

| Position | Partition 1 | Partition 2 | Partition 3 | Partition 4 | Partition 5 |
|---|---|---|---|---|---|
| 1 | Read only | Read only | Disabled | Read only | Read/write |
| 2 | Read only | Read only | Read/write | Read/write | Disabled |
| 3 | Read only | Read/write | Disabled | Read only | Disabled |
| 4 | Read/write | Read/write | Read/write | Read/write | Read/write. |

2. The data storage device of claim 1, wherein said mode switch has seven positions and the predetermined set of rules is defined by the following table:

| Position | Partition 1 | Partition 2 | Partition 3 | Partition 4 | Partition 5 |
|---|---|---|---|---|---|
| 1-(A, B, C) | Read only | Read only | Disabled | Read only | Read/write |
| 2-A | Read only | Read only | Read/write | Read/write | Disabled |
| 2-B | Read only | Disabled | Read/write | Read/write | Disabled |
| 2-C | Read only | Read/write | Read only | Read only | Disabled |
| 3-(A, B) | Read only | Read/write | Disabled | Read only | Disabled |
| 3-C | Read/write | Disabled | Disabled | Disabled | Disabled |
| 4-(A, B, C) | Read/write | Read/write | Read/write | Read/write | Read/write. |

3. The data storage device of claim 2, wherein said mode switch comprises a main switch with four positions (1-4) and a protection switch with three positions (A-C), and wherein the seven positions are defined by the combined settings of the main switch and the protection switch according to column 1 of the table.

4. The data storage device of claim 1, further comprising a first latch which must be released before said mode switch can be moved from position 2 to position 3.

5. The data storage device of claim 4, further comprising a second latch which must be released before said mode switch can be moved from position 3 to position 4.

6. The data storage device of claim 5, further comprising a third latch which must be released before said mode switch can be moved from position 1 to position 2.

* * * * *